(12) United States Patent
Froling et al.

(10) Patent No.: US 9,975,421 B2
(45) Date of Patent: May 22, 2018

(54) HEATED VEHICLE SHUTTER

(71) Applicant: GM GLOBAL TECHNOLOGY OPERATIONS LLC, Detroit, MI (US)

(72) Inventors: Thomas H. Froling, Beverly Hills, MI (US); David Schroeck, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 15/212,931

(22) Filed: Jul. 18, 2016

(65) Prior Publication Data
US 2018/0015819 A1    Jan. 18, 2018

(51) Int. Cl.
*B60K 11/04*  (2006.01)
*B60K 11/08*  (2006.01)

(52) U.S. Cl.
CPC ............ *B60K 11/085* (2013.01); *B60K 11/04* (2013.01)

(58) Field of Classification Search
CPC .............................. B60K 11/04; B60K 11/085
See application file for complete search history.

(56) References Cited

U.S. PATENT DOCUMENTS

| | | | |
|---|---|---|---|
| 2009/0017746 A1* | 1/2009 | Clemenz | F23L 13/00 454/188 |
| 2011/0031229 A1* | 2/2011 | Clemenz | F23L 13/00 219/213 |
| 2011/0070817 A1* | 3/2011 | Walters | B60K 11/085 454/155 |
| 2012/0168145 A1* | 7/2012 | Peterson | H05K 7/20745 165/287 |
| 2014/0132033 A1* | 5/2014 | Townson | B62D 25/084 296/193.1 |
| 2014/0138369 A1* | 5/2014 | Thompson | H05B 1/0236 219/203 |

* cited by examiner

*Primary Examiner* — Khoi H Tran
*Assistant Examiner* — Robert T Nguyen
(74) *Attorney, Agent, or Firm* — Quinn IP Law

(57) ABSTRACT

A shutter assembly includes a shutter frame and at least one louver moveably mounted to the shutter frame. The shutter assembly also includes a mechanism configured to shift the at least one louver relative to the shutter frame to select a position for the shutter assembly between and inclusive of fully-opened and fully-closed. The shutter assembly additionally includes a heating element configured to generate thermal energy sufficient to melt ice formation on the shutter assembly and facilitate shifting of the at least one louver relative to the shutter frame. Furthermore, the shutter assembly includes a controller configured to regulate the mechanism and activate the heating element. A method of controlling operation of a shutter assembly and a vehicle having such a shutter assembly are also disclosed.

18 Claims, 4 Drawing Sheets

HEATED VEHICLE SHUTTER

TECHNICAL FIELD

The disclosure relates to a heated airflow shutter for a motor vehicle.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

In motor vehicles, a shutter may be employed to control and direct a stream of light and/or air to various vehicle compartments. Therefore, a shutter may be employed to enhance comfort of vehicle passengers, as well as for cooling a range of vehicle systems.

SUMMARY

A shutter assembly includes a shutter frame and at least one louver moveably mounted to the shutter frame. The shutter assembly also includes a mechanism configured to shift the at least one louver relative to the shutter frame to select a position for the shutter assembly between and inclusive of fully-opened and fully-closed. The shutter assembly additionally includes a heating element configured to generate thermal energy to thereby melt or thaw ice formation on the shutter assembly and facilitate shifting of the at least one louver relative to the shutter frame. Furthermore, the shutter assembly includes a controller configured to regulate the mechanism and activate the heating element.

The shutter assembly may also include a temperature sensor in communication with the controller, wherein the temperature sensor is configured to sense ambient temperature.

The shutter assembly can additionally include a barometric pressure sensor configured to sense an ambient pressure and a moisture sensor configured to sense a level of ambient humidity. Each of the barometric pressure sensor and moisture sensor can be in communication with the controller. In such a case, the controller can be additionally configured to detect the ambient temperature via the temperature sensor, the ambient pressure via the barometric pressure sensor, and the level of ambient humidity via the moisture sensor. The controller can then also be configured to determine a dew point temperature using the detected ambient temperature, ambient pressure, and level of ambient humidity, and then activate the heating element in response to the determined dew point temperature being below a threshold dew point temperature.

The threshold dew point temperature can be around the freezing point.

The controller can be configured to activate the heating element for a predetermined amount of time. Such a predetermined amount of time can be indicative of the time needed to thaw ice on the shutter.

The heating element can be arranged on at least one of the louvers, the mechanism, and/or the shutter frame.

The shutter assembly may also include a force sensor in communication with the controller and configured to sense a force generated by the mechanism. In such a case, the controller can be additionally configured to monitor the force generated by the mechanism using the force sensor. The controller can also detect, via the force sensor, the force generated by the mechanism being above a predetermined magnitude of the force and activate the heating element in response to the detected force generated by the mechanism being above the predetermined magnitude of the force.

The shutter assembly may also include a position sensor in communication with the controller and configured to sense a position of the at least one louver. In such a case, the controller can be additionally configured to command the mechanism to shift the at least one louver to a predetermined position. The controller can also be configured to detect, via the position sensor, the position of the at least one louver following the mechanism being commanded to shift the at least one louver to the predetermined position. Furthermore, the controller can be configured to activate the heating element if the detected position of the at least one louver is divergent from the predetermined position.

The shutter assembly can be arranged in a vehicle having a power-source and configured to vary an amount of ambient airflow entering the vehicle to cool the power-source. Such a vehicle can include a grille opening, and the shutter assembly can be arranged either integral to the grille opening or adjacent thereto.

A method of controlling operation of a shutter assembly and a vehicle having such a shutter assembly are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
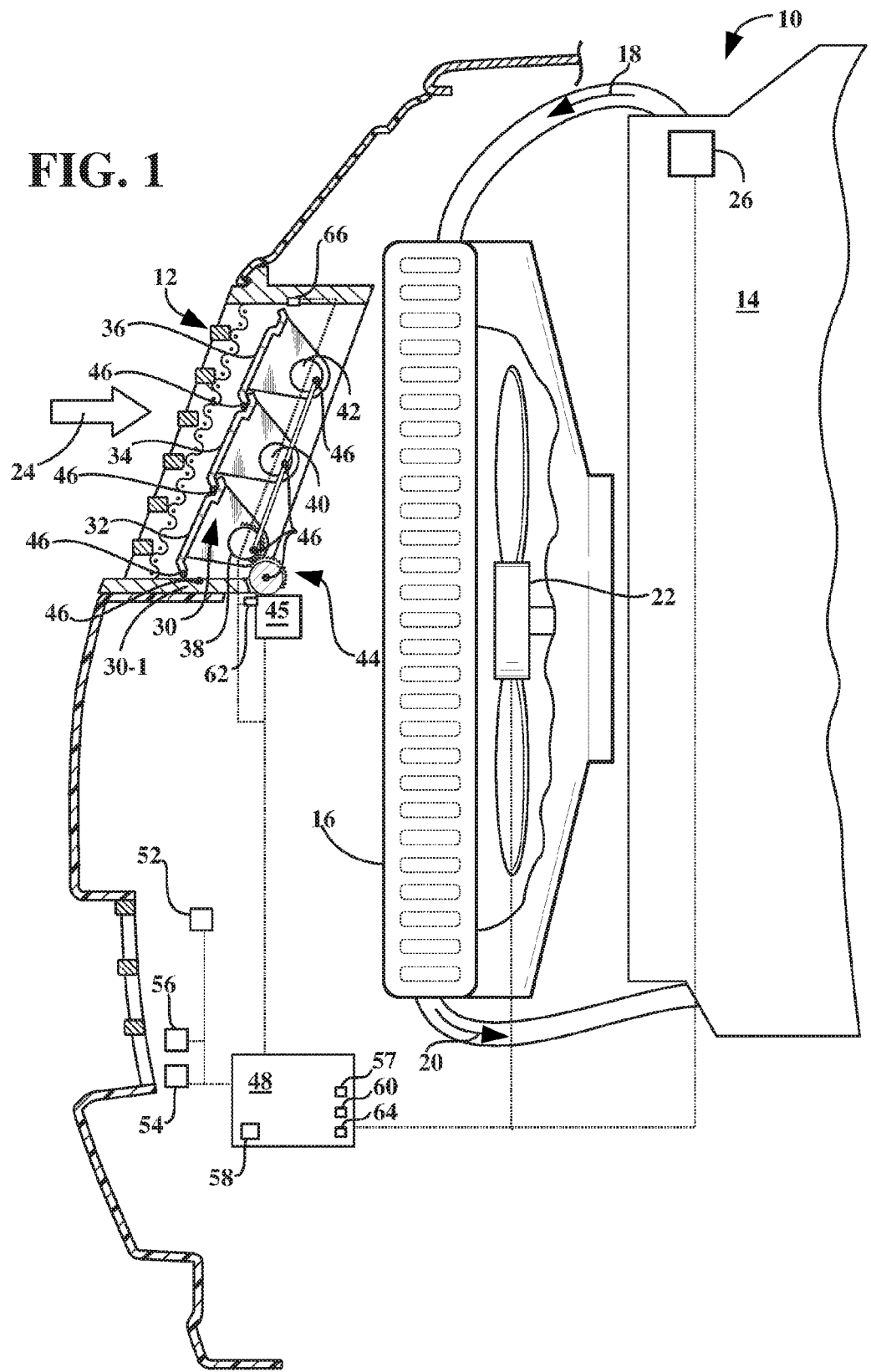
FIG. 1 is a partial side cross-sectional view of a vehicle having a heated shutter assembly depicted in a fully-closed state.
Figure 2:
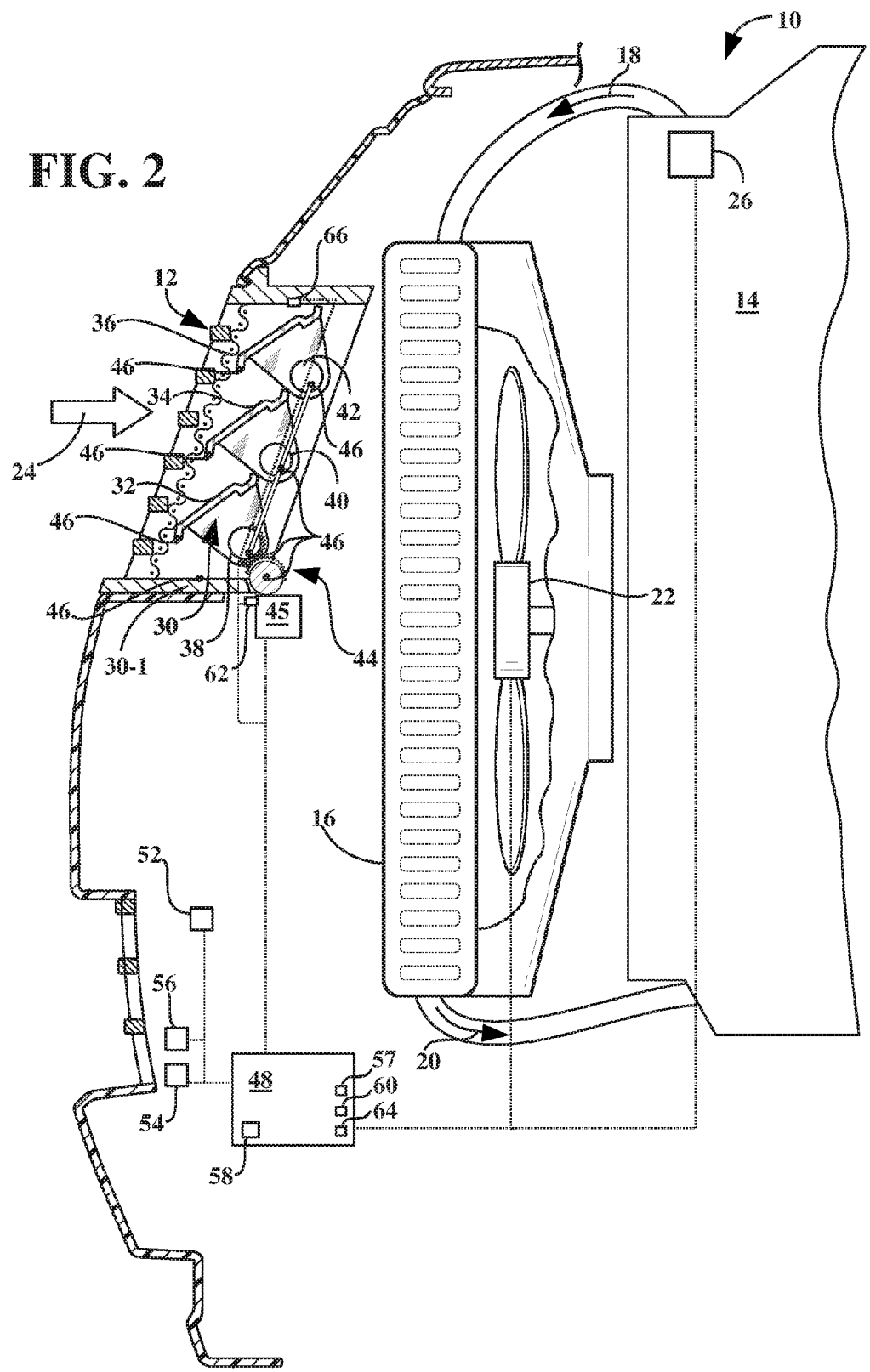
FIG. 2 is a partial side cross-sectional view of a vehicle having the heated shutter assembly shown in FIG. 1, with the shutter depicted in an intermediate state.
Figure 3:
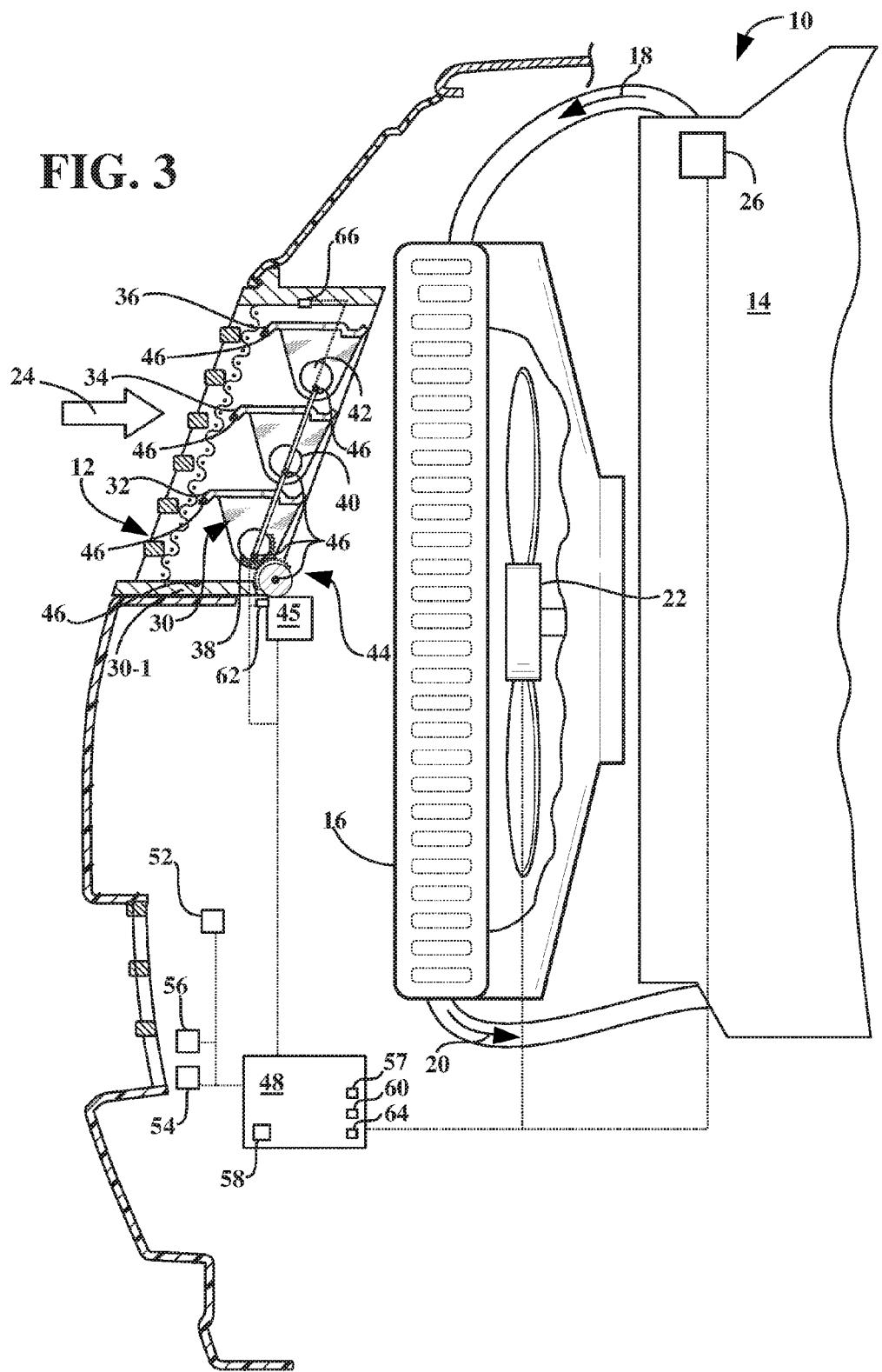
FIG. 3 is a partial side cross-sectional view of a vehicle having the heated shutter assembly system shown in FIGS. 1 and 2, with the shutter depicted in a fully-opened state.

Referring to the drawings, wherein like reference numbers refer to like components, FIGS. 1-3 show a partial side view of a vehicle 10. The vehicle 10 is shown to include a grille opening 12 typically covered with a mesh. The grille opening 12 is adapted for receiving ambient air. The vehicle 10 additionally includes a powertrain that is specifically represented by an internal combustion engine 14. The powertrain of the vehicle 10 may additionally include a transmission, and, if the vehicle is a hybrid type, one or more motor-generators, none of which is shown, but the existence of which can be appreciated by those skilled in the art.

Efficiency of a vehicle powertrain is generally influenced by its design, as well as by the various loads the powertrain sees during its operation.

The vehicle 10 additionally includes an air-to-fluid heat exchanger 16, i.e., a radiator, for circulating a cooling fluid shown by arrows 18 and 20, such as water or a specially formulated coolant, through the engine 14 to remove heat from the engine. A high-temperature coolant entering the heat exchanger 16 is represented by the arrow 18, and a reduced-temperature coolant being returned to the engine is represented by the arrow 20. The heat exchanger 16 is positioned behind the grille opening 12 for protection of the heat exchanger from various road-, and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grille opening 12 and the fan. The fan 22 is capable of being selectively turned on and off based on the cooling needs of the engine 14. Depending on the road speed of the vehicle 10, the fan 22 is adapted to either generate or enhance a stream of air or airflow 24 through the grille opening 12, and toward and through the heat exchanger 16. Thus generated or enhanced through the action of the fan 22, the airflow 24 is passed through the heat exchanger 16 to remove heat from the high-temperature coolant 18 before the reduced-temperature coolant 20 is returned to the engine 14. The fan 22 may be driven either mechanically, such as directly by the engine 14, or electrically via a dedicated electric motor (not shown). The vehicle 10 additionally includes a coolant sensor 26 configured to sense a temperature of the high-temperature coolant 18 as it exits the engine 14.

FIGS. 1-3 also depict a shutter assembly 30. The shutter assembly 30 is secured in the vehicle 10 and is adapted, i.e., configured, to control the airflow 24 through the grille opening 12. As shown, the shutter assembly 30 includes a plurality of movable louvers or vanes, herein shown as having three individual louver elements 32, 34, and 36, but the number of louvers may either be fewer or greater. Also as shown, the louver elements 32, 34, and 36 are moveably mounted to a shutter frame 30-1 and positioned between the grille opening 12 and the heat exchanger 16. In the depicted embodiment, each louver 32, 34, and 36 is configured to rotate about a respective pivot axis 38, 40, and 42 relative to the shutter frame 30-1 during operation of the shutter assembly 30, thereby effectively controlling the size of the grille opening 12. The shutter assembly 30 is configured to operate between and inclusive of a fully-closed position or state (as shown in FIG. 1), through an intermediate position (as shown in FIG. 2), and to a fully-opened position (as shown in FIG. 3).

When the louver elements 32, 34, and 36 are in any of their open positions, the airflow 24 penetrates the plane of shutter assembly 30 before coming into contact with the heat exchanger 16. As shown, the louver elements 32, 34, and 36 are positioned at the front of the vehicle 10, behind and immediately adjacent the grille opening 12. However, the shutter assembly 30 may also be incorporated into and be integral with the grille opening 12, in which case, the grille opening may incorporate the shutter frame 30-1. Although the description below will concentrate on an embodiment of the shutter assembly 30 that includes the plurality of rotatable louver elements 32, 34, 36, other embodiments of the shutter assembly 30, such as having sliding or otherwise movable louver elements or vanes, are also envisioned, and are thus within the scope of the present disclosure.

The shutter assembly 30 also includes a mechanism 44 configured to shift the louvers 32-36 relative to the shutter frame 30-1, to thereby select and lock a desired position for the shutter assembly between and inclusive of fully-opened and fully-closed. In the depicted embodiment, the mechanism 44 is configured to cause the louvers 32-36 to rotate in tandem, i.e., substantially in unison, into any of the available positions. The mechanism 44 may be configured to select and lock either discrete intermediate position(s) of the louvers 32-36, or to infinitely vary position of the louvers between and inclusive of the fully-opened and fully-closed regardless the specific type of motion the louver elements are configured to undertake relative to the shutter frame 30-1. The mechanism 44 acts to select the desired position for the shutter assembly 30 when activated by any external means, as understood by those skilled in the art, such as via an electric motor 45.

The shutter assembly 30 also includes at least one heating element 46. Each heating element 46 is configured to generate thermal energy sufficient to thaw, i.e., melt ice formation in various strategic locations on the shutter assembly 30. An individual heating element 46 can be positioned on each of the louver elements 32-36. Specifically, one of the heating elements 46 can be incorporated into a respective louver element's edge or surface 32-1 that may come into contact or close proximity with an adjacent louver element 32-36 or with the shutter frame 30-1. Accordingly, individual heating elements 46 can be arranged at the pivot axes 38, 40, and 42 of the respective louver element 32-36 and/or on the shutter frame 30-1. Additionally, individual heating element(s) 46 can be arranged on the mechanism 44. Activation of the heating element(s) 46 in any specific location on the shutter assembly 30 is intended to thaw actual or possible ice formation to facilitate shifting of the at least one louver relative to the shutter frame regardless of ambient temperatures and relative humidity.

The vehicle 10 also includes a controller 48, which may be an engine controller or a separate control unit, configured to regulate the mechanism 44 for selecting the desired position of the shutter assembly 30. The controller 48 is also configured to activate the heating element(s) 46 to thaw ice formation on the shutter assembly 30. As envisioned herein, the controller 48 may be additionally configured to operate the fan 22, if the fan is electrically driven, and a thermostat (not shown) that is configured to regulate the circulation of coolant 18, 20, as understood by those skilled in the art. The controller 48 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 48 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 48 may also include a floppy disk, a flexible disk, hard disk, magnetic tape, any other magnetic medium, a CD-ROM, DVD, any other optical medium, etc.

The controller 48 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 48 or accessible thereby may be stored in the memory and automatically executed to provide the required functionality.

The controller 48 is programmed to regulate the mechanism 44 according to the load on the engine 14 and, correspondingly, to the temperature of the high-temperature coolant 18 detected by the sensor 26. As understood by those skilled in the art, the temperature of circulated coolant is increased due to the thermal energy produced by the engine 14 under load. As also known, a load on the engine is typically dependent on operating conditions imposed on the vehicle 10, such as going up a hill and/or pulling a trailer. The load on the engine 14 generally drives up the engine's internal temperature, which in turn necessitates cooling of the subject engine for desired performance and reliability. Prior to exiting the engine 14, the coolant is routed inside the engine in order to most effectively remove heat from critical engine components, such as bearings (not shown, but known by those skilled in the art). Typically, the coolant 18, 20 is continuously circulated by a fluid pump (not shown) between the engine 14 and the heat exchanger 16. As the high-temperature coolant 18 enters the heat exchanger 16, the temperature of the coolant can be reduced via the airflow 24 controlled by the shutter assembly 30.

When the shutter assembly 30 is fully-closed, as depicted in FIG. 1, the louvers 32-36 provide blockage of the airflow 24 at the grille opening 12. A fully-closed shutter assembly 30 provides optimized aerodynamics for the vehicle 10 when engine cooling through the grille opening 12 is not required. The shutter assembly 30 may also be regulated by the controller 48 to variably restrict access of the oncoming airflow 24 to the heat exchanger 16, by rotating the louvers 32-36 to an intermediate position, as shown in FIG. 2, where the louvers are partially closed. An appropriate intermediate position of the louvers 32-36 is selected by the controller 48 according to a programmed algorithm to thereby affect the desired cooling of the engine 14. When the shutter assembly 30 is fully-opened, as shown in FIG. 3, each louver 32-36 is rotated to a position parallel to the airflow 24 seeking to penetrate the shutter system plane. Thus, a fully-opened shutter assembly 30 is configured to permit a generally unfettered passage of such a stream of air through the louver plane of the shutter assembly 30.

Ambient temperatures near and below freezing may present considerations for cooling of the powertrain in the vehicle 10. When the ambient temperature is near or below freezing, sufficient cooling of the engine 14 may be, at least initially, achieved with the grille opening 12 in the fully blocked state. However, as the engine 14 warms up, the grille opening 12 may need to be progressively opened. At the same time, when ambient temperatures near and below the freezing point are combined with moisture, i.e., relative humidity, in the ambient air, the louvers 32-36 and the mechanism 44 may experience ice formation thereon and, as a result, become jammed. To address such a concern, the controller 48 can be programmed to regulate the heating element(s) 46 when the ambient conditions are conducive to ice formation, to thereby prevent jamming of the shutter assembly 30.

To affect the above control of the heating element(s) 46, the controller 48 can be in communication with a temperature sensor 52 that is configured to sense ambient temperature. Also, the controller 48 can be in communication with a barometric pressure sensor 54 configured to sense an ambient pressure and in communication with a moisture sensor 56 configured to sense a level of ambient humidity. Accordingly, the controller 48 can be configured to monitor and detect the ambient temperature via the temperature sensor 52, the ambient pressure via the barometric pressure sensor 54, and the level of ambient humidity via the moisture sensor 56 any time the controller is operative. The controller 48 can also be configured to determine a dew point temperature using the detected ambient temperature, ambient pressure, and the level of ambient humidity. Furthermore, the controller 48 can be configured to subsequently activate the heating element(s) 46 in response to the determined dew point temperature being below a threshold dew point temperature 57, which can be pre-programmed into the controller.

The controller 48 can also include an internal timer 58, which the controller can use to activate the heating element(s) 46 for a predetermined amount of time 60. Such a predetermined amount of time 60 is intended to be sufficient to thaw ice on the shutter assembly 30 and restore unimpeded movement of the louvers 32-36 and the mechanism 44. During operation of the vehicle 10, the temperature of the powertrain, and, in particular the temperature being sensed by the sensor 26, is monitored by the controller 48. When the controller 48 receives a signal from the sensor 26 that the temperature of the engine coolant has increased such that the position of the shutter assembly 30 needs to be changed, any change in the position of the shutter assembly 30 can be delayed by the predetermined amount of time 60.

The shutter assembly 30 can additionally include a force sensor 62 configured to sense a force F generated by the mechanism 44, and in communication with the controller 48. Using the force sensor 62, the controller 48 can, therefore, monitor the force F and detect if the subject force generated by the mechanism 44 has exceeded a predetermined magnitude 64. The predetermined magnitude 64 of the force F can be indicative of the threshold amount of force that can be exerted by the mechanism 44 safely and without damage to any components of the shutter assembly 30. The controller 48 can also be configured to activate the heating element(s) 46 in response to the predetermined magnitude 64 of the force F being exceeded. With the aid of the force sensor 62, the controller 48 can effectuate a feedback control of the heating element(s) 46.

The shutter assembly 30 can additionally include one or more position sensors 66 in communication with the controller 48. As shown, each position sensor 66 is configured to sense a position of one of the respective louvers 32-36. A representative position sensor 66 can be configured, for example, as an optical proximity sensor arranged to sense a position of the particular louver 32-36. The controller 48 can be configured to command the mechanism 44 to shift each of the louvers 32-36 to their predetermined positions. The controller 48 can be additionally configured to detect, via the respective position sensors 66, the positions of the louvers 32-36 following the mechanism being commanded to shift the respective louvers to their predetermined positions. Furthermore, the controller 48 can be configured to activate the heating element(s) 46, if the detected position of the louvers 32-36 is divergent from their predetermined positions. For simplicity, the shutter assembly 30 can employ a single position sensor 66 arranged to sense a position of one particular louver 32, 34, or 36, which can be used as a general indicator of the position of all the louvers, to be compared with the particular louver's predetermined position for activating any or all the heating element(s) 46.

Figure 4:
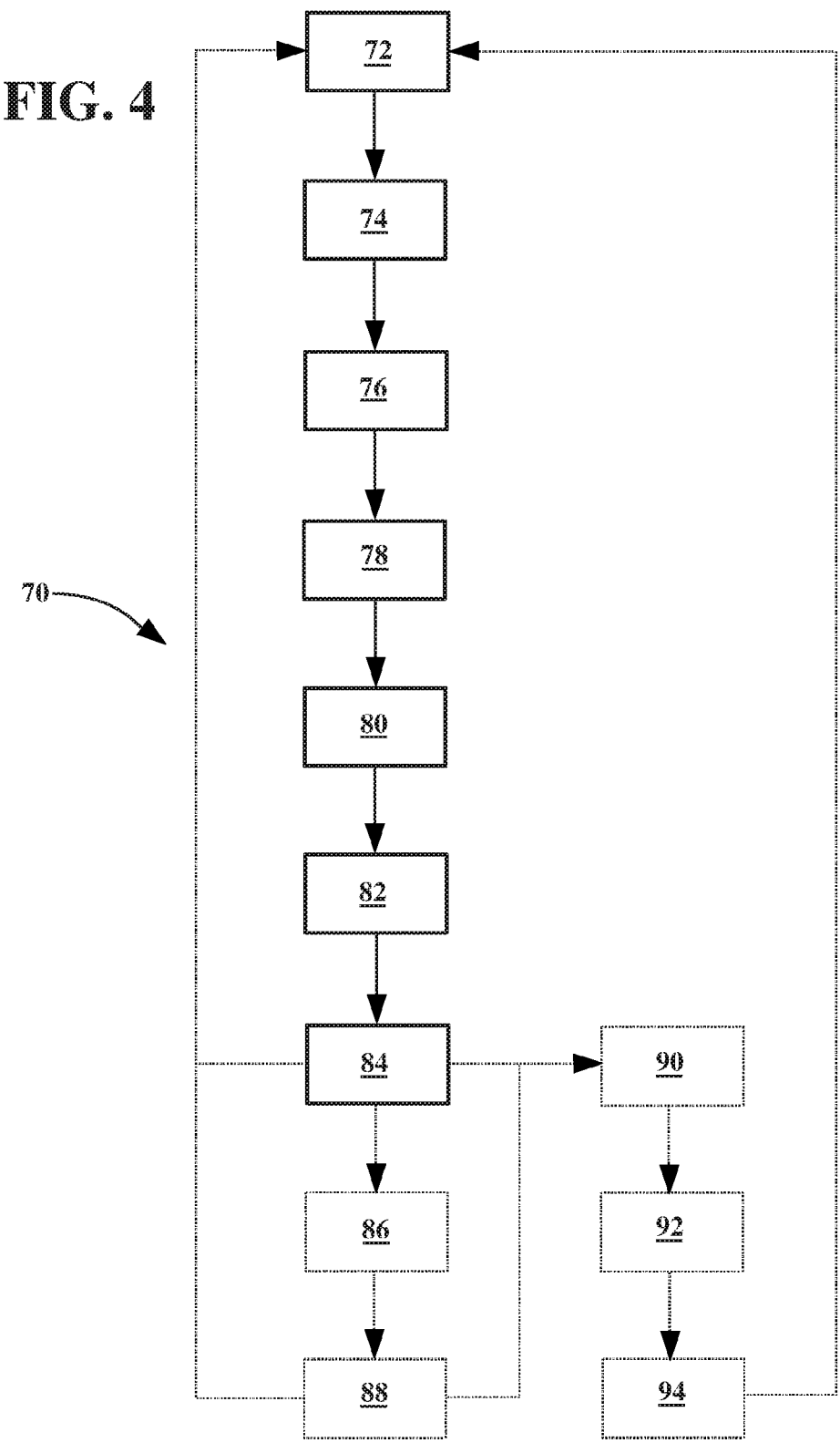
FIG. 4 is a flow chart illustrating a method controlling operation of the heated shutter assembly depicted in FIGS. 1-3.

FIG. 4 depicts a method 70 controlling operation of the shutter assembly 30, as described above with respect to FIGS. 1-3. The method commences in frame 72 with the controller 48 initialized and then proceeds to frame 74 where the method includes the controller receiving a signal indicative of intended operation of the shutter assembly 30 including one or more heating elements 46. Following frame 74, the method advances to frame 76. In frame 76, the method includes monitoring and detecting the ambient temperature via the temperature sensor 52. After frame 76, the method proceeds to frame 78. In frame 78, the method includes monitoring and detecting the ambient barometric pressure via the barometric pressure sensor 54 and the level of ambient humidity via the moisture sensor 56.

Following frame 78, the method proceeds to frame 80 where the method includes determining a dew point temperature using the detected ambient temperature, ambient pressure, and level of ambient humidity. After frame 80, in frame 82, the method includes activating, via the controller 48, the heating element(s) 46 if the determined dew point temperature is below the threshold dew point temperature 57. In frame 82 the method may additionally include activating the heating element(s) 46 for a predetermined amount of time needed to thaw ice on the shutter assembly 30. Following frame 82, the method advances to frame 84, where it includes regulating, via the controller 48, the mechanism 44 to shift the louvers 32-36 relative to the shutter frame 30-1 following the activation of the heating element(s) 46.

Following frame 84, the method may advance to frame 86. In frame 86 the method includes monitoring, via the force sensor 62, the force F generated by the mechanism 44 and detecting whether the force is above the predetermined magnitude 64. Additionally, following frame 86, the method may proceed to frame 88, where the method includes activating the heating element(s) 46 if the detected force F generated by the mechanism 44 is above the predetermined magnitude 64. Either following frame 84 of frame 88, the method may additionally proceed to frame 90. In frame 90 the method includes commanding the mechanism 44 to shift the louvers 32-36 to their predetermined position(s), as described above with respect to FIGS. 1-3. Following frame 90, the method may proceed to frame 92, where the method includes detecting the respective position(s) of any of the louvers 32-36 following the mechanism being commanded to shift the louvers to the predetermined position(s). Additionally, after frame 92, the method may proceed to frame 94, where the method includes activating the heating element(s) 46 if the detected position of the louver(s) 32-36 is divergent from the predetermined position.

Either after frame 84, 88, or 92, the method may loop back to frame 74 where the controller 48 will again receive a signal indicative of intended operation of the shutter assembly 30 for subsequent assessment of whether the heating element(s) 46 need to be reactivated to melt ice formation on any of the shutter assembly components.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling operation of a shutter assembly configured to vary an amount of ambient airflow entering a vehicle, the method comprising:
receiving a signal, via a controller, indicative of intended operation of the shutter assembly, wherein the shutter assembly includes:
a shutter frame, at least one louver moveably mounted to the shutter frame, a mechanism configured to shift the at least one louver relative to the shutter frame to select a position for the shutter assembly between and inclusive of fully-opened and fully-closed, and a heating element configured to generate thermal energy sufficient to melt ice formation on the shutter assembly and facilitate shifting of the at least one louver relative to the shutter frame;
detecting an ambient temperature via a temperature sensor in communication with the controller;
detecting an ambient pressure via a barometric pressure sensor in communication with the controller;
detecting a level of ambient humidity via a moisture sensor in communication with the controller;
determining, via the controller, a dew point temperature using the detected ambient temperature, the detected ambient pressure, and the detected level of ambient humidity; and
activating, via the controller, the heating element when the determined dew point temperature is below a threshold dew point temperature; and
regulating, via the controller, the mechanism to shift the at least one louver relative to the shutter frame.

2. The method of claim 1, further comprising activating the heating element, via the controller, for a predetermined amount of time.

3. The method of claim 1, wherein the heating element is arranged on one of the at least one louver, the mechanism, and the shutter frame.

4. The method of claim 1, wherein the shutter assembly additionally includes a force sensor in communication with the controller and configured to sense a force generated by the mechanism, the method further comprising:
determining if the force generated by the mechanism is above a predetermined magnitude of the force; and
activating the heating element when the detected force generated by the mechanism is above the predetermined magnitude of the force.

5. The method of claim 1, wherein the shutter assembly additionally includes a position sensor in communication with the controller and configured to sense a position of the at least one louver, the method further comprising:
commanding the mechanism to shift the at least one louver to a predetermined position;
detecting, via the position sensor, the position of the at least one louver following the mechanism being commanded to shift the at least one louver to the predetermined position; and activating the heating element when the detected position of the at least one louver is divergent from the predetermined position.

6. A shutter assembly comprising:
a shutter frame;
at least one louver mounted moveably to the shutter frame;
a mechanism configured to shift the at least one louver relative to the shutter frame to select a position for the shutter assembly between and inclusive of fully-opened and fully-closed;
a heating element configured to generate thermal energy sufficient to melt ice formation on the shutter assembly and facilitate shifting of the at least one louver relative to the shutter frame;
a controller configured to regulate the mechanism and activate the heating element;
a temperature sensor in communication with the controller and configured to sense an ambient temperature; and
a barometric pressure sensor configured to sense an ambient pressure and a moisture sensor configured to sense a level of ambient humidity, each of the barometric pressure sensor and the moisture sensor in communication with the controller, wherein the controller is additionally configured to:
detect, via the temperature sensor, the ambient temperature;
detect, via the barometric pressure sensor, the ambient pressure;
detect, via the moisture sensor, the level of ambient humidity;
determine a dew point temperature using the detected ambient temperature, ambient pressure, and level of ambient humidity; and
activate the heating element when the determined dew point temperature is below a threshold dew point temperature.

7. The shutter assembly of claim 1, wherein the controller is configured to activate the heating element for a predetermined amount of time.

8. The shutter assembly of claim 1, wherein the heating element is arranged on one of the at least one louver, the mechanism, and the shutter frame.

9. The shutter assembly of claim 1, further comprising a force sensor in communication with the controller and configured to sense a force generated by the mechanism, wherein the controller is additionally configured to:
determine if the force generated by the mechanism is above a predetermined magnitude of the force; and
activate the heating element when the detected force generated by the mechanism is above the predetermined magnitude of the force.

10. The shutter assembly of claim 1, further comprising a position sensor in communication with the controller and configured to sense a position of the at least one louver, wherein the controller is additionally configured to:
command the mechanism to shift the at least one louver to a predetermined position;
detect, via the position sensor, the position of the at least one louver following the mechanism being commanded to shift the at least one louver to the predetermined position; and
activate the heating element if the detected position of the at least one louver is divergent from the predetermined position.

11. A vehicle comprising:
a power-source configured to generate torque and propel the vehicle;
a grille opening arranged on the vehicle and configured to receive ambient airflow; and
a shutter assembly configured to selectively restrict and unrestrict the grille opening to vary an amount of the ambient airflow entering the vehicle to cool the power-source, the adjustable shutter assembly including:
a shutter frame;
at least one louver mounted moveably to the shutter frame;
a mechanism configured to shift the at least one louver relative to the shutter frame to select a position for the shutter assembly between and inclusive of fully-opened and fully-closed;
a heating element configured to generate thermal energy sufficient to melt ice formation on the shutter assembly and facilitate shifting of the at least one louver relative to the shutter frame; and
a controller configured to regulate the mechanism and activate the heating element.

12. The vehicle of claim 11, further comprising a temperature sensor in communication with the controller and configured to sense an ambient temperature.

13. The vehicle of claim 12, further comprising a barometric pressure sensor configured to sense an ambient pressure and a moisture sensor configured to sense a level of ambient humidity, each of the barometric pressure sensor and moisture sensor in communication with the controller, wherein the controller is additionally configured to:
detect, via the temperature sensor, the ambient temperature;
detect, via the barometric pressure sensor, the ambient pressure;
detect, via the moisture sensor, the level of ambient humidity;
determine a dew point temperature using the detected ambient temperature, ambient pressure, and level of ambient humidity; and
activate the heating element when the determined dew point temperature is below a threshold dew point temperature.

14. The vehicle of claim 11, wherein the controller is configured to activate the heating element for a predetermined amount of time.

15. The vehicle of claim 11, wherein the heating element is arranged on one of the at least one louver, the mechanism, and the shutter frame.

16. The vehicle of claim 11, further comprising a force sensor in communication with the controller and configured to sense a force generated by the mechanism, wherein the controller is additionally configured to:
determine if the force generated by the mechanism is above a predetermined magnitude of the force; and
activate the heating element if the detected force generated by the mechanism is above the predetermined magnitude of the force.

17. The vehicle of claim 11, further comprising a position sensor in communication with the controller and configured to sense a position of the at least one louver, wherein the controller is additionally configured to:
command the mechanism to shift the at least one louver to a predetermined position;

detect, via the position sensor, the position of the at least one louver following the mechanism being commanded to shift the at least one louver to the predetermined position; and activate the heating element when the detected position of the at least one louver is divergent from the predetermined position.

18. The vehicle of claim 11, wherein the shutter assembly is arranged one of integral to the grille opening and adjacent to the grille opening.

* * * * *